(12) United States Patent
Yea et al.

(10) Patent No.: US 11,166,048 B2
(45) Date of Patent: Nov. 2, 2021

(54) METHOD AND APPARATUS FOR VIDEO CODING

(71) Applicant: Tencent America LLC, Palo Alto, CA (US)

(72) Inventors: Sehoon Yea, Palo Alto, CA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 16/567,814

(22) Filed: Sep. 11, 2019

(65) Prior Publication Data

US 2020/0107048 A1 Apr. 2, 2020

Related U.S. Application Data

(60) Provisional application No. 62/740,306, filed on Oct. 2, 2018, provisional application No. 62/743,948, filed on Oct. 10, 2018.

(51) Int. Cl.
*G06T 9/40* (2006.01)
*H04N 19/96* (2014.01)
*H04N 19/154* (2014.01)
*H04N 19/147* (2014.01)

(52) U.S. Cl.
CPC .............. *H04N 19/96* (2014.11); *G06T 9/40* (2013.01); *H04N 19/147* (2014.11); *H04N 19/154* (2014.11)

(58) Field of Classification Search
CPC .... H04N 19/154; H04N 19/96; H04N 19/597; H04N 19/147; H04N 19/46; G06T 9/40; G06T 9/004; G06T 9/001
See application file for complete search history.

(56) References Cited

U.S. PATENT DOCUMENTS

| | | | |
|---|---|---|---|
| 2009/0279608 A1* | 11/2009 | Jeon | H04N 19/50 375/240.16 |
| 2011/0010400 A1 | 1/2011 | Hayes | |
| 2012/0014438 A1* | 1/2012 | Segall | H04N 19/46 375/240.12 |

(Continued)

OTHER PUBLICATIONS

Rufael Mekuria et al., Requirements for Point Cloud Compression, Feb. 2016, 3 pages.

(Continued)

*Primary Examiner* — Dave Czekaj
*Assistant Examiner* — Berteau Joisil
(74) *Attorney, Agent, or Firm* — Oblon, McClelland, Maier & Neustadt, L.L.P.

(57) ABSTRACT

A method of processing point cloud data at a decoder can include receiving three dimensional (3D) coordinates of a set of points of a point cloud including first points and a current point. Each of the first points can be associated with a reconstructed attribute value. A group of neighboring points of the current point can be determined from the first points. An indicator is received. The indicator indicates whether reconstruction of the current point in a prediction step in a lifting scheme is based on a weighted average prediction of the reconstructed attribute values of the plurality of neighboring points. The current point is reconstructed based on the received indicator.

21 Claims, 10 Drawing Sheets

(56) References Cited

U.S. PATENT DOCUMENTS

2014/0354637 A1    12/2014  Reiner et al.
2019/0081638 A1*   3/2019   Mammou ........... H03M 7/6035

OTHER PUBLICATIONS

Christian Tulvan et al., Use Cases for Point Cloud Compression (PCC), Jun. 2016, 8 pages.
Khaled Mammou, PCC Test Model Category 3 v1, Jan. 2018, 8 pages.
PCT International Search Report issued in Application PCT/US2019/053564 dated Jan. 30, 2020, (21 pages).
Krivokuca et al. "A Volumetric Approach to Point Cloud Compression." In: Cornell University Library/Electrical Engineering and Systems Science/Image and Video Processing, Sep. 30, 2018. (22 pages).

* cited by examiner

METHOD AND APPARATUS FOR VIDEO CODING

INCORPORATION BY REFERENCE

This present disclosure claims the benefit of priority to a series of U.S. Provisional Application No. 62/740,306, filed on Oct. 2, 2018, and 62/743,948, filed on Oct. 10, 2018, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Three-dimensional (3D) representations of the world are enabling more immersive forms of interaction and communication, and also allow machines to understand, interpret and navigate the world. Point clouds have emerged as one of such 3D enabling representations. The Moving Picture Experts Group (MPEG) has identified a number of use cases associated with point cloud data, and developed corresponding requirements for point cloud representation and compression.

SUMMARY

Aspects of the disclosure provide methods and apparatuses for video encoding/decoding.

According to an embodiment of the present disclosure, a method of processing cloud point data in a decoder can be provided. In the method, three dimensional (3D) coordinates of a set of points of a point cloud are received. The set of points includes first points and a current point. Each of the first points can be associated with a reconstructed attribute value. A group of neighboring points of the current point can be determined from the first points. An indicator is received. The indicator indicates whether reconstruction of the current point in a prediction step in a lifting scheme is based on a weighted average prediction of the reconstructed attribute values of the plurality of neighboring points. The current point is reconstructed based on the received indicator.

According to an embodiment of the present disclosure, another method of processing cloud point data in a decoder can be provided. In the method, three dimensional (3D) coordinates of a set of points of a point cloud are received. The set of points includes first points and a current point and each of the first points is associated with a reconstructed attribute value. A plurality of neighboring points of the current point is determined from the first points. Further, an attribute value predictor for the current point used in a prediction step in a lifting scheme is determined based on a weighted sum function when a measurement of variability of the reconstructed attribute values of the plurality of neighboring points is below a threshold. In the method, the prediction step is performed before an updating step in the lifting scheme.

According to an embodiment of the present disclosure, another method of processing cloud point data in a decoder can be provided. In the method, three dimensional (3D) coordinates of a set of points of a point cloud are received. The set of points includes first points and a current point and each of the first points is associated with a reconstructed attribute value. A plurality of neighboring points of the current point is determined from the first points. An indicator is received. The indicator indicates whether reconstruction of the current point in a prediction step in a lifting scheme is based on a weighted average prediction of the reconstructed attribute values of the plurality of neighboring points or based on a reconstructed attribute value having the lowest cost among the reconstructed attribute values of the plurality of neighboring points. The current point is reconstructed based on the received indicator.

Further, according to an embodiment of the present disclosure, an apparatus of processing cloud point data can be provided. The apparatus includes processing circuitry that can be configured to receive three dimensional (3D) coordinates of a set of points of a point cloud including first points and a current point. Each of the first points is associated with a reconstructed attribute value. The processing circuitry is further configured to determine a plurality of neighboring points of the current point from the first points. The processing circuitry is further configured to receive an indicator indicating whether reconstruction of the current point in a prediction step in a lifting scheme is based on a weighted average prediction of the reconstructed attribute values of the plurality of neighboring points. The processing circuitry is further configured to reconstruct the current point based on the received indicator.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Point Cloud Compression Systems

1. Point Cloud Data

Point cloud data is used to represent a three-dimensional (3D) scene or object in some emerging applications such as immersive virtual reality (VR)/augmented reality (AR)/mixed reality (MR), automotive/robotic navigation, medical imaging, and the like. A point cloud includes a collection of individual 3D points. Each point is associated with a set of 3D coordinates indicating a 3D position of the respective point and a number of other attributes such as color, surface normal, opaque, reflectance, etc. In various embodiments, input point cloud data can be quantized and subsequently organized into a 3D grid of cubic voxels that can be described using an octree data structure. A resulting voxelized octree facilitates the traversal, search, and access of the quantized point cloud data.

A point cloud is a set of points in a 3D space, each with associated attributes, e.g., color, material properties, etc. Point clouds can be used to reconstruct an object or a scene as a composition of such points. They can be captured using multiple cameras and depth sensors in various setups, and may be made up of thousands and even billions of points in order to realistically represent reconstructed scenes.

Compression technologies are needed to reduce the amount of data required to represent a point cloud. As such, technologies are needed for lossy compression of point clouds for use in real-time communications and six Degrees of Freedom (6 DoF) virtual reality. In addition, technologies are sought for lossless point cloud compression in the context of dynamic mapping for autonomous driving and cultural heritage applications, etc. Further, standards are needed to address compression of geometry and attributes (e.g., colors and reflectance), scalable/progressive coding, coding of sequences of point clouds captured over time, and random access to subsets of the point cloud.

2. Coordinates Quantization

In an embodiment, coordinates of points in the input cloud data can first be quantized. For example, real number values of the coordinates may be quantized into integer values. After the quantization, more than one point may share a same position in some voxels. Those duplicate points optionally can be merged into a single point.

3. Geometry Coding Based on an Octree

Figure 1:
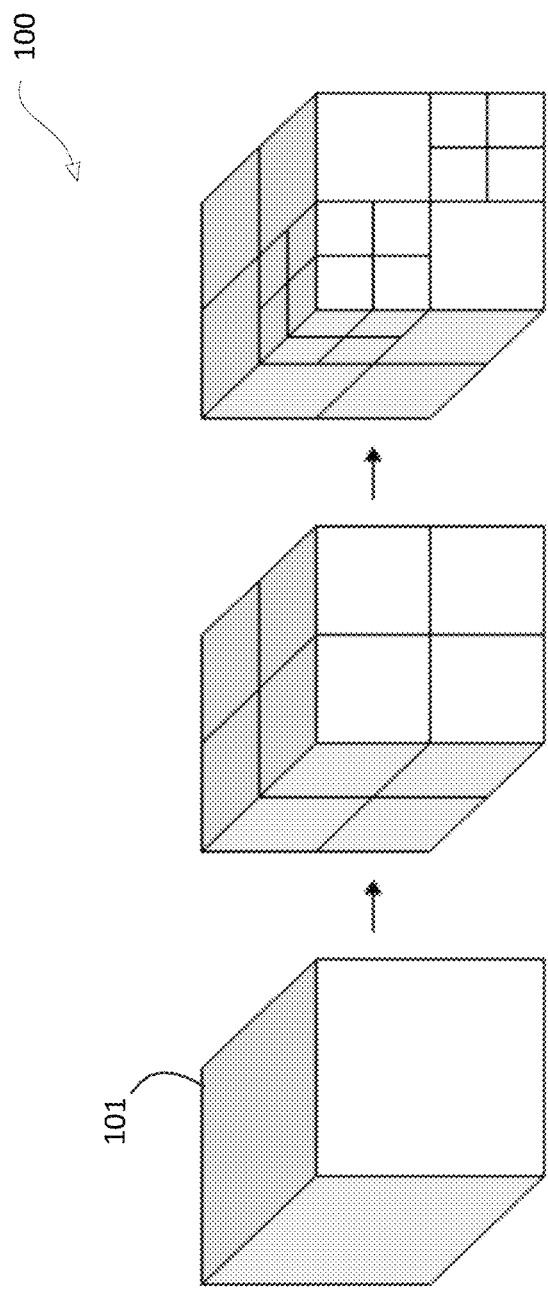
FIG. 1 shows a recursive subdivision process in accordance with an embodiment.

FIG. 1 shows a recursive subdivision process (100) in accordance with an embodiment. The process (100) can be performed to generate an octree structure to represent positions of a set of points in a point cloud. As shown, a cubical axis-aligned bounding box (101) containing the set of points is first defined. Then, the bounding box (101) is recursively subdivided to build the octree structure. As shown, at each stage, a current cube can be subdivided into 8 sub-cubes. An 8-bit code, referred to as an occupancy code, can be generated to indicate whether each of the 8 sub-cubes contains points. For example, each sub-cube is associated with a 1-bit value. If the sub-cube is occupied, the respective sub-cube has a bit value of 1; otherwise, the respective sub-cube has a bit value of 0. Occupied sub-cubes can be divided until a predefined minimum size of the sub-cubes is reached. A sub-cube of the minimum size is a voxel corresponding to the octree structure. A sequence of occupancy codes can thus be generated, and subsequently be compressed and transmitted from an encoder to a decoder. By decoding the occupancy codes (e.g., performing an octree decoding process), the decoder can obtain a same octree structure as the encoder, or an estimation of the octree structure.

3. Attribute Transfer

As a result of the octree generation or coding process, at the encoder side, a sub-cube with the minimum size may contain more than one point. Thus, a position corresponding to a voxel (e.g., a center of the respective sub-cube) may correspond to multiple sets of attributes from multiple points. In such a scenario, in an embodiment, an attribute transfer process can be performed to determine one set of attributes based on the multiple sets of attributes for the respective voxel. For example, an averaged attribute of a subset of nearest neighboring points can be used as an attribute of the respective voxel. Different methods may be employed in various embodiments for attribute transfer purposes.

4. Level of Detail (LOD) Generation

Figure 2:
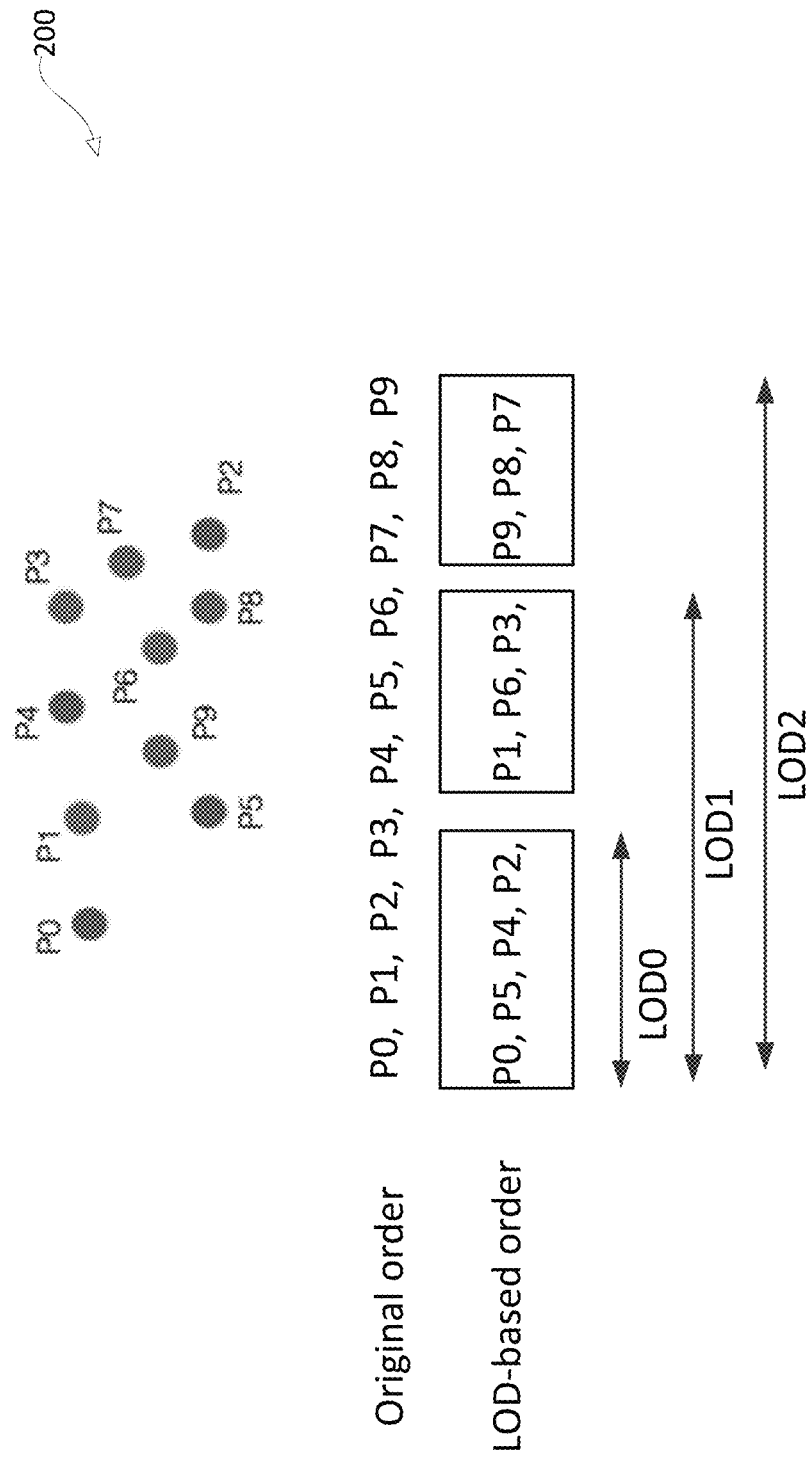
FIG. 2 shows a level of detail (LOD) generation process in accordance with an embodiment.

FIG. 2 shows a level of detail (LOD) generation process (200) in accordance with an embodiment. The process (200) can be performed on the quantized positions (e.g., voxel positions) ordered according to the octree decoding process. As a result of the process (200), the points can be re-organized or re-ordered into a set of refinement levels. The process (200) can be performed identically at the encoder and decoder. A subsequent attribute coding process can be performed at the encoder or decoder according to the order defined by the process (200) (referred to as the LOD-based order).

Specifically, FIG. 2 shows three LODs: LOD0, LOD1, and LOD2. A Euclidean distance, d0, d1, or d2, can be specified for LOD0, LOD1, and LOD2, respectively. A subset of points P0-P9 is included in each LOD. The distances between each pair of points in the respective LOD is larger than or equal to the respective Euclidean distance. The Euclidean distances can be arranged in a manner that d0>d1>d2. Under such arrangement, a higher refinement level includes fewer points that are farther from each other, and provides a coarser representation of the point cloud, while a lower refinement level includes more points closer to each other, and provides a finer representation of the point cloud.

As a result of the above LOD generation process (200), the points in an original order (octree decoding order) from P0 to P9 can be re-organized into an LOD-based order: P0, P5, P4, P2, P1, P6, P3, P9, P8, and P7.

5. Attributes Prediction

The attributes associated with the point cloud can be encoded and decoded in the order defined by the LOD generation process. For example, point by point, in the LOD-based order, an attribute prediction of each current point (a point currently under processing) can be determined by performing an attribute prediction process at the encoder and/or decoder. A similar attribute prediction process can be performed at the encoder and the decoder.

With the obtained attribute prediction, at the encoder, a residual signal can be generated by subtracting the attribute prediction value from a respective original attribute value of the current point. The residual signal can then, individually or in combination with other residual signals, be further compressed. For example, transform and/or quantization operations may be performed, and followed by entropy coding of resulting signals. The compressed residual signal can be transmitted to the encoder in a bit stream.

At the decoder, a residual signal can be recovered by performing an inverse of the coding process at the encoder for coding a residual signal. With the obtained attribute prediction and the recovered residual signal corresponding to the current point, a reconstructed attribute of the current point can be obtained. In a similar way, this reconstruction operation may take place at the encoder to obtain a reconstructed attribute.

Various attribute prediction techniques can be employed in various embodiments to determine the attribute prediction. Typically, the attribute prediction of the current point is performed using previously reconstructed attributes of points neighboring the current point. When the attribute prediction process is started, based on the LOD-based order, reconstructed attribute values of points prior to the current point are already available. In addition, from the octree coding or decoding process, positions (3D coordinates) of the points in the point cloud are also available. Accordingly, the attribute prediction process can be performed with the knowledge of the reconstructed attributes and 3D coordinates of the neighboring points of the current point.

In some embodiments, a set of neighboring points of the current point can first be determined using various algorithms. In one example, a k-d tree structure based searching process can be performed to determine a set of points nearest to the current point.

In some embodiments, a geometric distance and/or attribute distance based approach is used to determine the attribute prediction. The prediction attribute can be determined based on a weighted sum (or weighted average) of reconstructed attributes of a set of determined neighboring points at the encoder or decoder. For example, with the set of determined neighboring points, the weighted sum (or weighted average) of the reconstructed attributes of the determined neighboring points can be determined to be the prediction attribute at the encoder or decoder. For example, a weight used in the weighted sum based technique (also referred to as an interpolation based technique) can be an inverse of (or inversely proportional to) a geometric distance, or an attribute distance. Alternatively, the weight can be a bilateral weight derived from a combination of a geometric distance based weight (a geometric eight) and an attribute distance based weight (an attribute weight).

In some embodiments, a rate-distortion (RD) based approach is used to determine the attribute prediction. For example, a candidate index may be associated with each reconstructed attribute value of the set of neighboring points at the encoder or decoder. At the encoder, an RD optimization based process can be performed to evaluate which one of the candidate reconstructed attribute values of the neighboring points is the best choice to be used as the attribute prediction. For example, a distortion can be measured by a difference between the original (or true) attribute value of the current point and a candidate prediction (candidate reconstructed attribute value). A rate can be a cost of encoding the index of the selected candidate prediction. A Lagrangian RD-cost function can be defined to determine the best prediction signal candidate. A candidate index of the selected candidate prediction can thus be signaled to the decoder.

Accordingly, the decoder may first determine a same set of neighboring points of a respective current point, and associate indices to the reconstructed attribute values of the same set of neighboring points in a similar way as the encoder side. Then, the decoder can determine an attribute prediction from the reconstructed attribute values of the neighboring points using the signaled candidate index.

6. Coding System Examples of Point Cloud Compression

Figure 3:
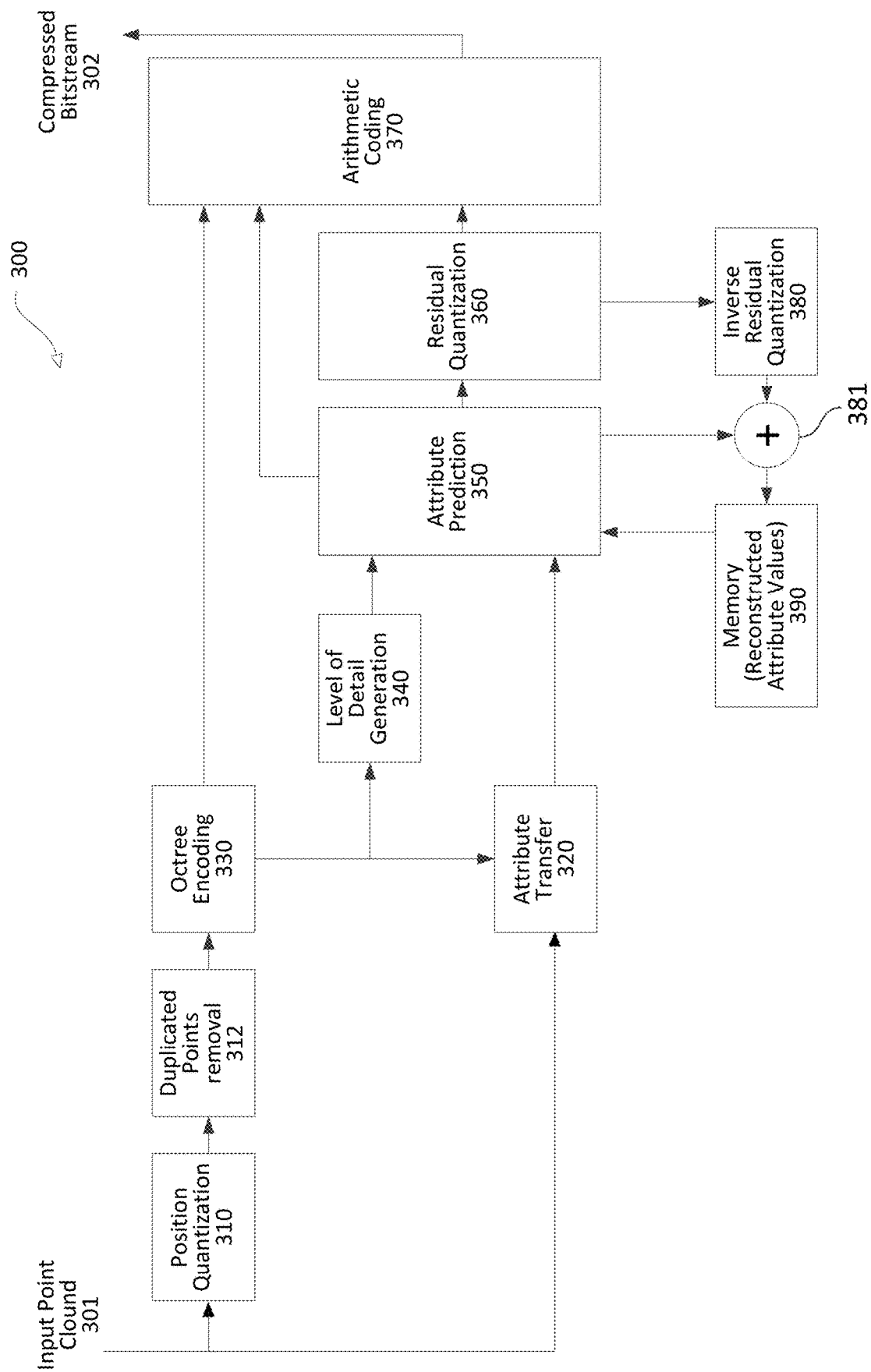
FIG. 3 shows an exemplary encoder in accordance with an embodiment.

FIG. 3 shows an exemplary encoder (300) in accordance with an embodiment. The encoder can be configured to receive an point cloud data and compress the point cloud data to generate a bit stream carrying compressed point cloud data. In an embodiment, the encoder (300) can include a position quantization module (310), a duplicated points removal module (312), an octree encoding module (330), an attribute transfer module (320), an LOD generation module (340), an attribute prediction module (350), a residual quantization module (360), an arithmetic coding module (370), an inverse residual quantization module (380), an addition module (381), and a memory (390) to store reconstructed attribute values.

As shown, an input point cloud (301) can be received at the encoder (300). Positions (3D coordinates) of the point cloud (301) are provided to the quantization module (310). The quantization module (310) is configured to quantize the coordinates to generate quantized positions. The optional duplicated points removal module (312) is configured to receive the quantized positions and perform a filter process to identify and remove duplicated points. The octree encoding module (330) is configured to receive filtered positions from the duplicated points removal module, and perform an octree-based encoding process to generate a sequence of occupancy codes that describe a 3D grid of voxels. The occupancy codes are provided to the arithmetic coding module (370).

The attribute transfer module (320) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (330). The attributes after the transfer operations are provided to the attribute prediction module (350). The LOD generation module (340) is configured to operate on the re-ordered points output from the octree encoding module (330), and re-organize the points into different LODs. LOD information is supplied to the attribute prediction module (350).

The attribute prediction module (350) processes the points according to an LOD-based order indicated by the LOD information from the LOD generation module (340). The attribute prediction module (350) generates an attribute prediction for a current point based on reconstructed attributes of a set of neighboring points of the current point stored in the memory (390). Prediction residuals can subsequently be obtained based on original attribute values received from the attribute transfer module (320) and locally generated attribute predictions. When candidate indices are used in the respective attribute prediction process, an index corresponding to a selected prediction candidate may be provided to the arithmetic coding module (370).

The residual quantization module (360) is configured to receive the prediction residuals from the attribute prediction module (350), and perform quantization to generate quantized residuals. The quantized residuals are provided to the arithmetic coding module (370).

The inverse residual quantization module (380) is configured to receive the quantized residuals from the residual quantization module (360), and generate reconstructed prediction residuals by performing an inverse of the quantization operations performed at the residual quantization module (360). The addition module (381) is configured to receive the reconstructed prediction residuals from the inverse residual quantization module (380), and the respective attribute predictions from the attribute prediction module (350). By combining the reconstructed prediction residuals and the attribute predictions, the reconstructed attribute values are generated and stored to the memory (390).

The arithmetic coding module (370) is configured to receive the occupancy codes, the candidate indices (if used), the quantized residuals (if generated), and other information, and perform entropy encoding to further compress the received values or information. As a result, a compressed bitstream (302) carrying the compressed information can be generated. The bitstream (302) may be transmitted, or otherwise provided, to a decoder that decodes the compressed bitstream, or may be stored in a storage device.

Figure 4:
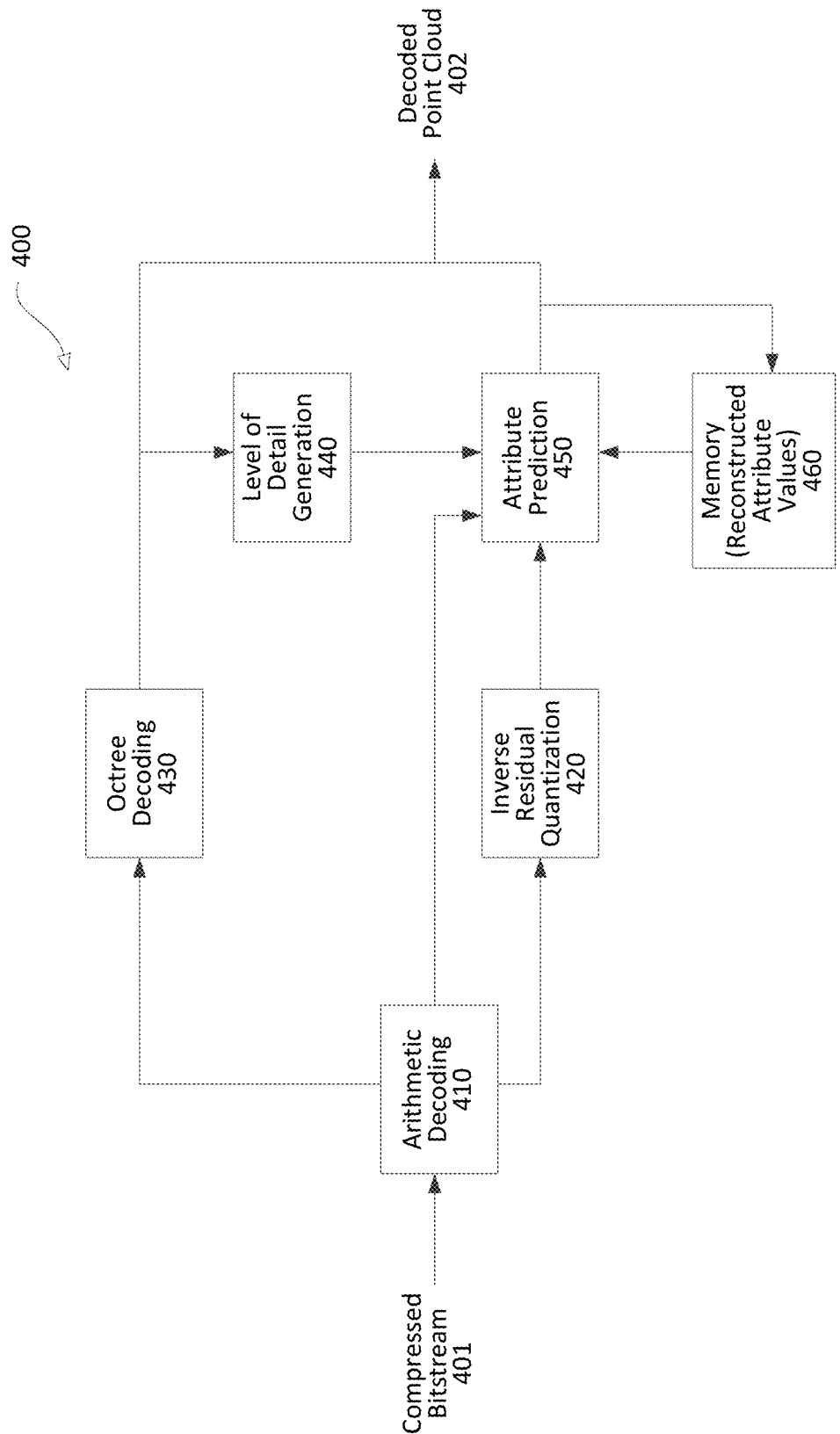
FIG. 4 shows an exemplary decoder in accordance with an embodiment.

FIG. 4 shows an exemplary decoder (400) in accordance with an embodiment. The decoder (400) can be configured to receive a compressed bitstream and perform point cloud data decompression to decompress the bitstream to generate decoded point cloud data. In an embodiment, the decoder (400) can include an arithmetic decoding module (410), an inverse residual quantization module (420), an octree decoding module (430), an LOD generation module (440), an attribute prediction module (450), and a memory (460) to store reconstructed attribute values.

As shown, a compressed bitstream (401) can be received at the arithmetic decoding module (410). The arithmetic decoding module (410) is configured to decode the compressed bitstream (401) to obtain quantized residuals (if generated) and occupancy codes of a point cloud. The octree decoding module (430) is configured to determine reconstructed positions of points in the point cloud according to the occupancy codes. The LOD generation module (440) is configured to re-organize the points into different LODs based on the reconstructed positions, and determine an LOD-based order. The inverse residual quantization module (420) is configured to generate reconstructed residuals based on the quantized residuals received from the arithmetic decoding module (410).

The attribute prediction module (450) is configured to perform an attribute prediction process to determine attribute predictions for the points according to the LOD-based order. For example, an attribute prediction of a current point can be determined based on reconstructed attribute values of neighboring points of the current point stored in the memory (460). The attribute prediction module (450) can combine the attribute prediction with a respective reconstructed residual to generate a reconstructed attribute for the current point.

A sequence of reconstructed attributes generated from the attribute prediction module (450) together with the reconstructed positions generated from the octree decoding module (430) corresponds to a decoded point cloud (402) that is output from the decoder (400) in one example. In addition, the reconstructed attributes are also stored into the memory (460) and can be subsequently used for deriving attribute predictions for subsequent points.

In various embodiments, the encoder (300) and decoder (400) can be implemented with hardware, software, or combination thereof. For example, the encoder (300) and decoder (400) can be implemented with processing circuitry such as one or more integrated circuits (ICs) that operate with or without software, such as an application specific integrated circuit (ASIC), field programmable gate array (FPGA), and the like. For another example, the encoder (300) and decoder (400) can be implemented as software or firmware including instructions stored in a non-volatile (or non-transitory) computer-readable storage medium. The instructions, when executed by processing circuitry, such as one or more processors, causing the processing circuitry to perform functions of the encoder (300) and decoder (400).

It is noted that the attribute prediction modules (350) or (450) configured to implement the attribute prediction techniques disclosed herein can be included in other decoders or encoders that may have similar or different structures from what is shown in FIG. 3 and FIG. 4. In addition, the encoder (300) and decoder (400) can be included in a same device, or separate devices in various examples.

7. Lifting Scheme Using the LOD Decomposition

The lifting transform builds on top of the predicting transform. One of the main differences between the lifting scheme and the prediction scheme is the introduction of an update operator.

Figure 5:
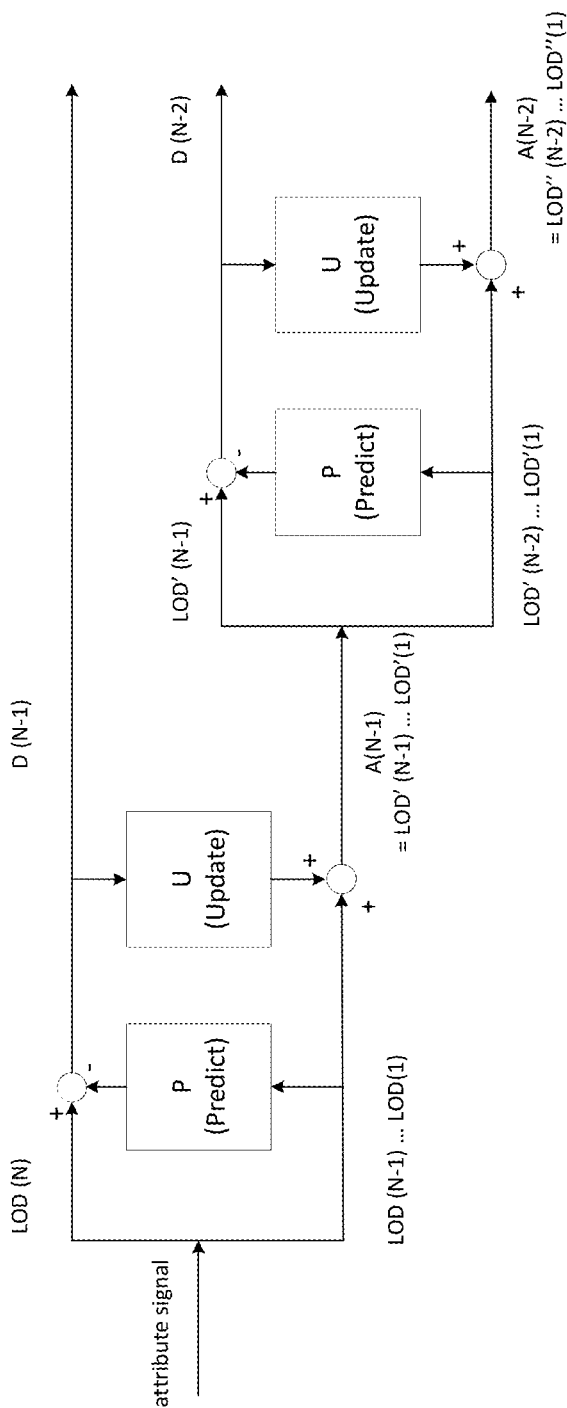
FIG. 5 shows an exemplary P/U lifting scheme using the LOD structure.

FIG. 5 shows an exemplary architecture of P/U (Prediction/Update) lifting in Test Model Category 13 (TMC13). A weighted average prediction based on geometric distances between a current sample and other neighboring samples may be used in the prediction (P) step in the lift scheme. In order to facilitate the prediction and updating steps in lifting, the input attribute signal may be split into two sets of high-correlation signals at each stage of decomposition. For example, the input attribute signal including LOD(N), LOD (N−1) . . . LOD(1) may be split into LOD(N) and LOD (N−1) . . . LOD(1). In the lifting scheme in TMC13, the splitting is performed by leveraging the LOD structure described above where such high-correlation is expected among levels and each level is constructed by nearest-neighbor search to organize the non-uniform point clouds into a structured data. For example, LOD(N−1) . . . LOD(1), which may be an even sample set, can be used as a predictor for LOD(N). LOD(N) may be an odd sample set. Then a difference signal D(N−1) is generated based on a difference between LOD(N) and an LOD(N) predictor. This difference signal D(N−1) may be a high-pass signal. Further, a low-pass signal A(N−1) can be generated after the updating step as an approximation signal of LOD(N−1) . . . LOD(1).

Accordingly, a P/U decomposition step at level N results in a detail signal D(N−1) and an approximation signal A(N−1), which may be further decomposed into D(N−2) and A(N−2). This step may be repeated until the base layer approximation signal A(1) is obtained. As a result, instead of coding the input attribute signal itself which consists of LOD(N), . . . , LOD(1), one ends up coding D(N−1), D(N−2), . . . , D(1), A(1) in the lifting scheme. The application of efficient P/U steps often leads to sparse subbands "coefficients" in D(N−1) . . . D(1), thereby providing the transform coding gain advantage.

Figure 6:
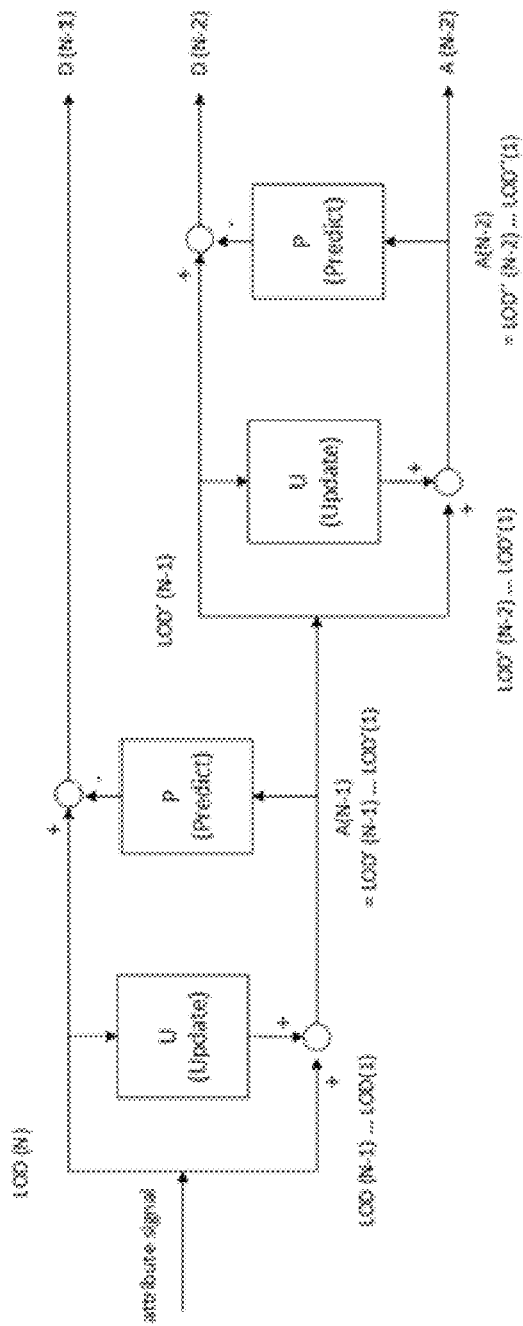
FIG. 6 shows an exemplary U/P lifting scheme using the LOD structure.

FIG. 6 describes an exemplary U/P lifting scheme using the LOD decomposition according to an embodiment of the present disclosure. An attribute value adaptive predictor described below can be applied to the prediction step under the architecture shown in both FIG. 5 and FIG. 6.

One of the main differences between the U/P lifting structure described in FIG. 6 and the P/U lifting structure described in FIG. 5 is that each updating step is performed before the corresponding prediction step. The U/P lifting structure described in FIG. 6 has a benefit of allowing perfect synchronization of the encoder and the decoder in a manner akin to Differential Pulse Code Modulation (DPCM) prevalent in modern video codecs. That is, unlike the lifting scheme described in FIG. 5, the encoder and the decoder may have the same neighboring samples available for prediction in the lifting scheme. In FIG. 5, the encoder and the decoder may not have the same neighboring samples available for prediction in the lifting scheme as depicted because the encoder may use the original (uncoded) neighboring samples for prediction and the decoder may use the quantized neighboring samples for prediction.

This "synchronization" between the encoder and the decoder described in FIG. 6 is possible even in the presence of quantization in lossy and near-lossless coding scenarios because of the DPCM-like structure. Under this architecture, one has a complete freedom of designing the U-step in an arbitrary manner to create a lower-subband incorporating information such as the presence of edges to build a better approximation signal which benefits the following prediction step.

In the lifting schemes described in FIG. 5 and FIG. 6, the prediction step may use the weighting factor which is the inverse of the geometric distance between the current sample and each of its neighboring samples to form a weighted sum of neighboring attribute values as prediction. In areas where the attribute values are smoothly varying or homogeneous, this tends to be effective. However, in other cases, there can be very low correlation between the attribute-value difference and the geometric distance, thereby rendering the geometry-based weighted prediction step ineffective for attribute coding.

Accordingly, to enhance the performance of the prediction step in the lifting scheme, an attribute value adaptive predictor may be used in the prediction step in the lifting scheme instead of the weighted average prediction based on geometric distances.

Instead of using a purely geometric-distance based weighted-sum as prediction, the present disclosure describes adaptively choosing the best candidate neighbor sample that minimizes the cost-function which directly trades off the attribute-prediction distortion and rate defined below.

In one embodiment, a rate-distortion (RD) decision-based predictor may be used for the prediction step in the lifting scheme described in FIG. 5 and in FIG. 6. The predictor may choose the prediction signal for a sample Q given its neighborhood $NN_Q$ as follows: PRED $$(a(Q)) \triangleq \begin{cases} \sum_{P_i \in NN_Q} w(P_i) a(P_i), & \text{if } maxDiff(NN_Q) < \text{Threshold} \\ a(P_m) \text{ where } m \triangleq \arg\min_i L(P_i), & \text{otherwise} \end{cases}$$

In the above Formula 1, $NN_Q$ is the nearest-neighbor set of the sample Q; $a(\cdot)$ represents an attribute of the sample; $w(P_i)$ calculates a geometric weight of each of the neighboring samples $P_i$; and $L(P_i)=D(Q,P_i)+\lambda \cdot R(P_i)$ is the cost function of each one of the neighboring samples, which takes the prediction error and the associated candidate-index coding rates into account. Moreover, maxDiff is a measurement of sample-value variability, which is defined as the maximum difference of attribute values among the neighbors. If $maxDiff(NN_Q)$ is smaller than a specified threshold, then a neighboring area surrounding the current sample may be smooth and homogeneous and a weighted average of neighboring samples may be used as the prediction for the current sample. In the weighted average prediction, the weight may be inversely proportional to the geometric distance of the current sample from each of the neighbor samples.

However, if $maxDiff(NN_Q)$ is not smaller than the specified threshold, then one of the neighboring samples may be chosen as the best candidate and is used as the prediction for the current sample. The chosen neighboring sample may have a lowest RD cost among the cost of each one of the neighboring samples calculated based on the above-described cost function.

As mentioned above, it is noted that in some examples, unlike the predictor in the DPCM, the encoder and the decoder do not have the same reconstructed samples available for prediction in the lifting scheme as depicted in FIG. 5 because the encoder may use the original (uncoded) neighboring samples for prediction and the decoder may use the quantized neighboring samples for prediction. Therefore, the maxDiff condition check in the above formula may not be made identical between the encoder and decoder.

Accordingly, in some examples, the decoder may not perform the same maxDiff condition check using the same neighboring samples in the lifting scheme described in FIG. 5. As result, the encoder may perform the maxDiff condition check using the original (uncoded) neighbor samples and then signal a one-bit flag indicating whether the weighted average prediction is used. If the signal does not indicate the weighted average prediction is used, it may then have to additionally signal which one of the neighboring samples is used as prediction after performing an RD cost function on each of the neighboring samples. On the decoder side, the decoder may receive the one-bit flag and check if the weighted average prediction is used based on the one-bit flag. The decoder may further receive another flag, which is the index of predictor if the weighted average predictor is not used.

However, if Formula 1 is used in the U/P lifting structure described in FIG. 6, the encoder and the decoder may have the same reconstructed neighboring samples available for prediction. Thus, the encoder may not need to signal a flag to the decoder indicating which method of attribute prediction is used and the decoder may perform the maxDiff condition check without receiving a signal from the encoder. As a result, a one-bit signal may be saved. In this case, the decoder may determine whether $maxDiff(NN_Q)$ is smaller than a specified threshold, and a weighted average of neighboring samples may be used as the prediction for the current sample if $maxDiff(NN_Q)$ is determined to be smaller than the specified threshold. In the weighted average prediction, the weight may be inversely proportional to the geometric distance of the current sample from each of the neighbor samples. If the decoder determines that $maxDiff(NN_Q)$ is not smaller than the specified threshold, then the decoder may receive an index indicating which neighboring sample (best candidate) is used as the attribute value predictor for the current sample. The encoder may perform the RD cost function on each of the neighboring samples and choose one of the neighboring samples as the best candidate. The index of the best candidate may be signaled to the decoder. The chosen neighboring sample may have a lowest RD cost among the cost of each one of the neighboring samples calculated based on the above-described cost function.

Formula 1

In another embodiment, an RD-decision based predictor described above may be modified as follows:

$$PRED(a(Q)) \triangleq$$

$$\begin{cases} a_{avg} \triangleq \sum_{P_i \in NN_Q} w(P_i) a(P_i), & \text{if } L*(a_{avg}) < \min_i L(P_i) \\ a(P_m) \text{ where } m \triangleq \arg\min_i L(P_i), & \text{otherwise} \end{cases}$$

Formula 2

In the above Formula 2, $NN_Q$ is the nearest-neighbor set of the sample Q; $a(\cdot)$ represents an attribute of the sample;

w($P_i$) calculates a geometric weight of each of the neighboring samples $P_i$; L($P_i$)=D(Q,$P_i$)+λ·R($P_i$) is the cost function that takes the prediction error and the associated candidate-index coding rates into account when a($P_i$) is chosen as the prediction; and L*($a_{avg}$) ≙ D(a(Q), $a_{avg}$)+λ·R($a_{avg}$) is the corresponding cost function when $a_{avg}$ is chosen as the prediction. It is noted that there may be N+1 candidate indices because the weighted average predictor is an additional candidate when N is the number of nearest-neighbor samples in $NN_Q$.

As mentioned above, it is noted that in some examples, unlike the predictor in the DPCM, the encoder and the decoder do not have the same reconstructed samples available for prediction in the lifting scheme as depicted in FIG. 5 because the encoder may use the original (uncoded) neighboring samples for prediction and the decoder may use the quantized neighboring samples for prediction. Therefore, when Formula 2 is used in the P/U lifting scheme described in FIG. 5 or the U/P lifting scheme described in FIG. 6, the encoder may first determine a neighboring sample with the lowest cost among the neighboring samples based on the RD cost function and then compare the cost of the weighted average predictor to the lowest cost of the neighboring sample. The encoder may signal an index indicating the best candidate among the neighboring samples and the weighted average predictor. If the cost of the weighted average predictor is lower than the lowest cost of the neighboring sample, then the best attribute value candidate is the weighted average predictor. If the cost of the weighted average predictor is higher than or equal to the lowest cost of the neighboring sample, then the best attribute value candidate is the neighboring sample with the lowest cost. Therefore, unlike when Formula 1 is used in the P/U lifting scheme described in FIG. 5 where the encoder may need to signal two flags, the encoder here may need to signal only one flag, which is a single index indicating the best candidate among the neighboring samples and the weighted average predictor. The decoder may receive the single index and the single index may indicate whether the weighted average predictor is used or which one of the neighboring samples is used as the prediction for the current sample.

Figure 7:
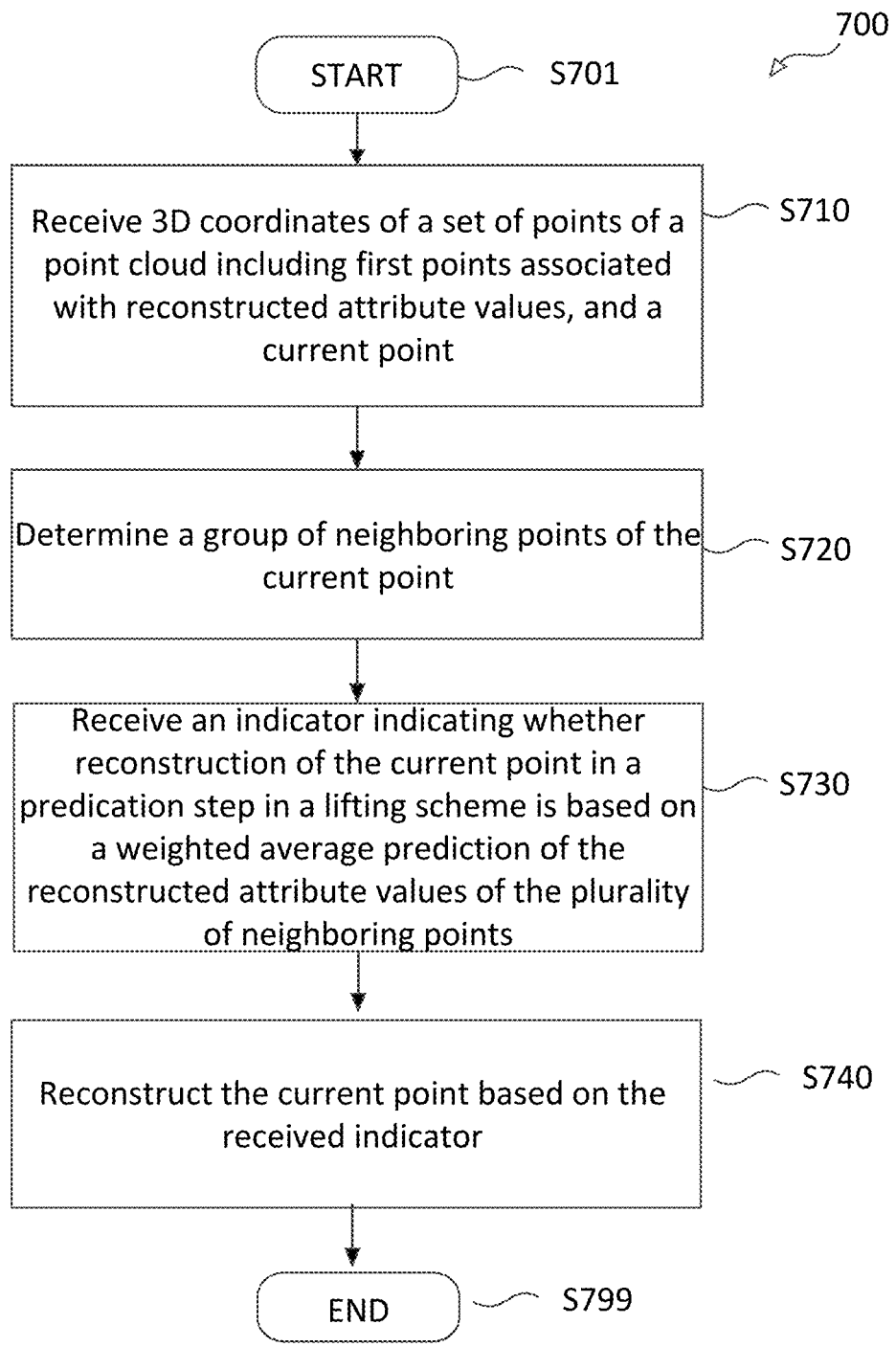
FIG. 7 shows an exemplary prediction process in the lifting scheme according to an embodiment of the disclosure.

FIG. 7 shows a flow chart outlining an exemplary process (700) according to an embodiment of the disclosure. The process (700) can be used to generate an attribute prediction of a current point of a point cloud at an encoder side or a decoder side. In various embodiments, the process (700) can be executed by processing circuitry, such as the processing circuitry performing functions of the attribute prediction module (350) in the encoder (300), or the processing circuitry performing functions of the attribute prediction module (450) in the encoder (400). In some embodiments, the process (700) is implemented in software instructions, thus when the processing circuitry executes the software instructions, the processing circuitry performs the process (700). The process starts at (S701) and proceeds to (S710).

At (S710), 3D coordinates of a set of points of a point cloud can be received. For example, the 3D coordinates can be obtained from an octree coding or decoding process. However, other coding or decoding processes can be utilized in other embodiments. In addition, the set of points can include first points of which attribute values have been reconstructed and available for attribute prediction of a current point included in the set of points.

At (S720), a group of neighboring points of the current point can be determined from the first points, as described above. For example, the group of neighboring points can be a set of nearest neighboring points in terms of geometric distances to the current point.

At (S730), an indicator is received indicating whether reconstruction of the current point in a prediction step in a lifting scheme is based on a weighted average prediction of the reconstructed attribute values of the plurality of neighboring points. For example, the encoder may perform the maxDiff condition check described above using the original (uncoded) neighbor samples and then signal a one-bit flag to the decoder indicating whether the weighted average prediction is used.

In another example, the encoder may perform a rate-distortion function on each of the reconstructed attribute values of the plurality of neighboring points and select one of the reconstructed attribute values of the plurality of neighboring points having a lowest cost based on the rate-distortion function. Further, the encoder may determine an attribute value predictor for the current point used in a prediction step in a lifting scheme based on a weighted average prediction when a cost of a weighted average of the reconstructed attribute values of the plurality of neighboring points is lower than the lowest cost of the selected one of the reconstructed attribute values of the plurality of neighboring points. This method may be performed in the P/U lifting scheme described in FIG. 5.

At (S740), the current point is reconstructed based on the received indicator. For example, when the received indicator indicates the weighted average prediction is used, the decoder may reconstruct the attribute value of the current point using the weighted average prediction. The process (700) proceeds to (S799), and terminates at (S799).

Figure 8:
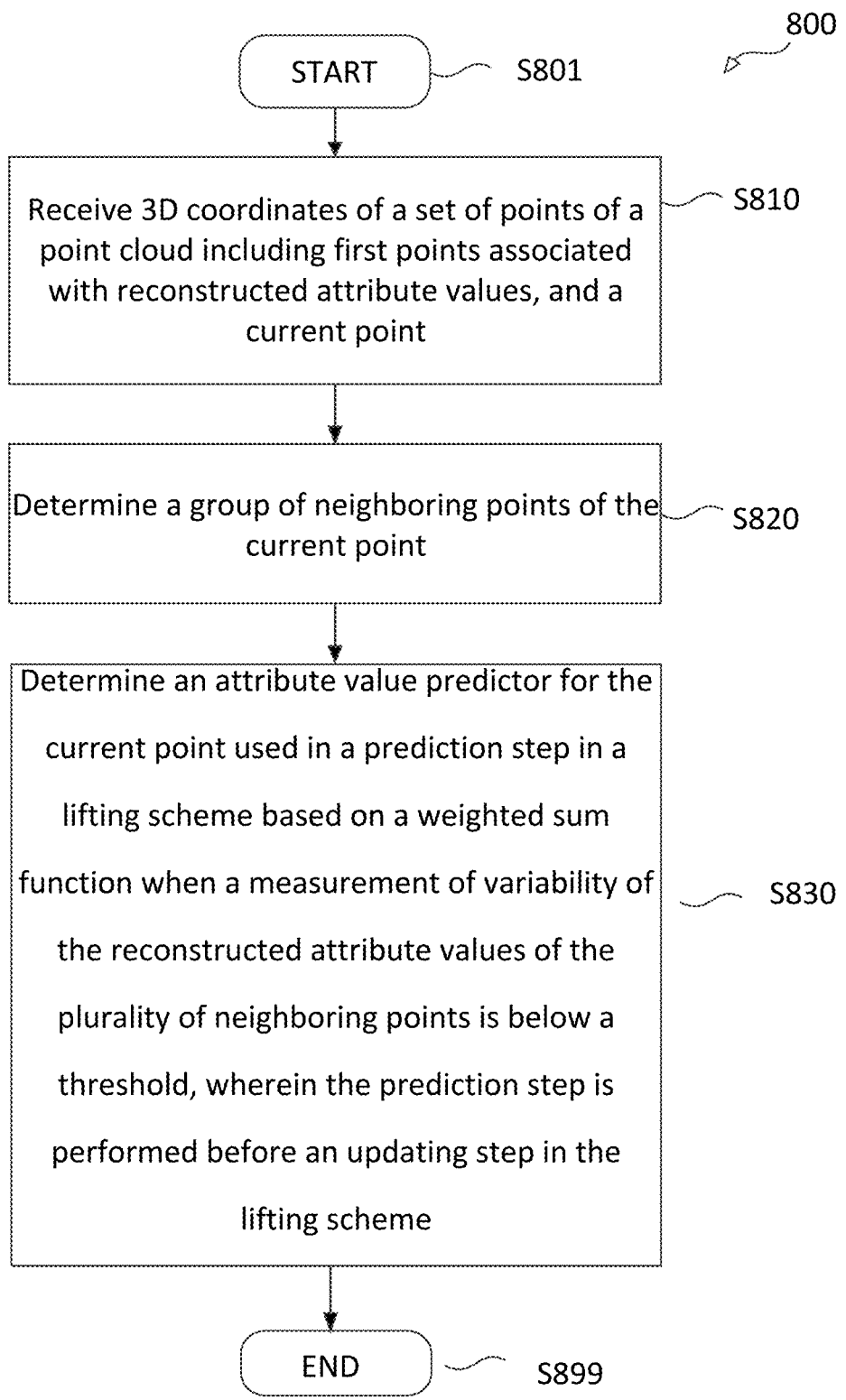
FIG. 8 shows an exemplary prediction process in the lifting scheme according to an embodiment of the disclosure.

FIG. 8 shows a flow chart outlining an exemplary process (800) according to an embodiment of the disclosure. The process (800) can be used to generate an attribute prediction of a current point of a point cloud at an encoder side or a decoder side. In various embodiments, the process (800) can be executed by processing circuitry, such as the processing circuitry performing functions of the attribute prediction module (350) in the encoder (300), or the processing circuitry performing functions of the attribute prediction module (450) in the encoder (400). In some embodiments, the process (800) is implemented in software instructions, thus when the processing circuitry executes the software instructions, the processing circuitry performs the process (800). The process starts at (S801) and proceeds to (S810).

At (S810), 3D coordinates of a set of points of a point cloud can be received. For example, the 3D coordinates can be obtained from an octree coding or decoding process. However, other coding or decoding processes can be utilized in other embodiments. In addition, the set of points can include first points of which attribute values have been reconstructed and available for attribute prediction of a current point included in the set of points.

At (S820), a group of neighboring points of the current point can be determined from the first points, as described above. For example, the group of neighboring points can be a set of nearest neighboring points in terms of geometric distances to the current point.

At (S830), an attribute value predictor for the current point is determined used in a prediction step in a lifting scheme based on a weighted sum function when a measurement of variability of the reconstructed attribute values of the plurality of neighboring points is below a threshold, wherein the prediction step is performed before an updating step in the lifting. For example, the decoder determines may determine whether a measurement of variability of the reconstructed attribute values of the plurality of neighboring points is smaller than a specified threshold, and a weighted average of neighboring samples may be used as the prediction for the current sample if the measurement of variability of the reconstructed attribute values of the plurality of neighboring points determined to be smaller than the specified threshold. The measurement of variability of the reconstructed attribute values of the plurality of neighboring points may be a maximum difference of attribute values among the neighboring samples, $\text{maxDiff}(NN_Q)$. In the weighted average prediction, the weight may be inversely proportional to the geometric distance of the current sample from each of the neighbor samples. If the decoder determines that $\text{maxDiff}(NN_Q)$ is not smaller than the specified threshold, then the decoder may receive an index indicating which neighboring sample (best candidate) is to be used as the attribute value predictor for the current sample. The encoder may perform the RD cost function on each of the neighboring samples and choose one of the neighboring samples as the best candidate. The index of the best candidate may be signaled to the decoder. The chosen neighboring sample may have a lowest RD cost among the cost of each one of the neighboring samples calculated based on the above-described cost function. This method may be performed in the U/P lifting scheme described in FIG. 6. In the process (800) proceeds to (S899), and terminates at (S899).

Figure 9:
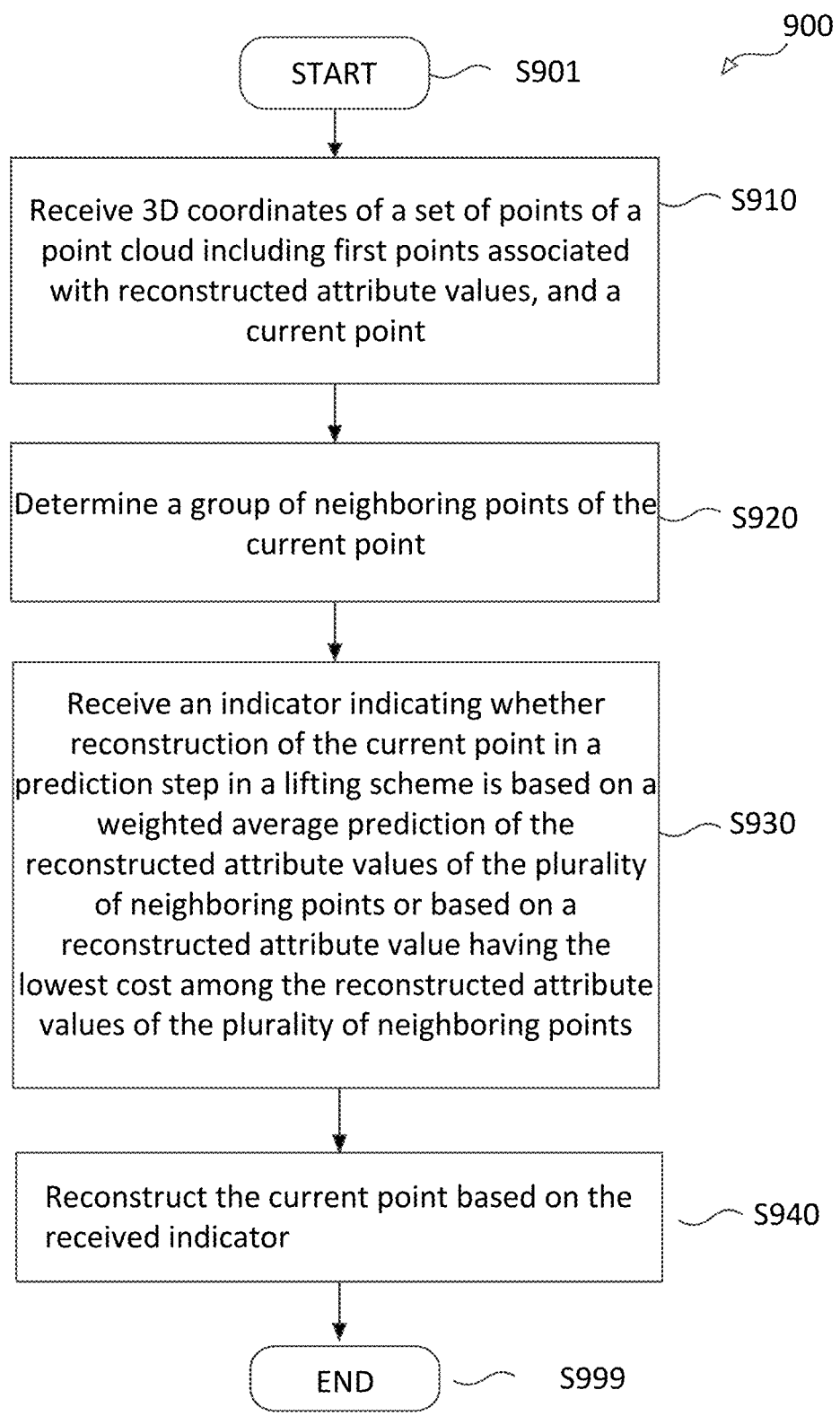
FIG. 9 shows an exemplary prediction process in the lifting scheme according to an embodiment of the disclosure.

FIG. 9 shows a flow chart outlining an exemplary process (900) according to an embodiment of the disclosure. The process (900) can be used to generate an attribute prediction of a current point of a point cloud at an encoder side or a decoder side. In various embodiments, the process (900) can be executed by processing circuitry, such as the processing circuitry performing functions of the attribute prediction module (350) in the encoder (300), or the processing circuitry performing functions of the attribute prediction module (450) in the encoder (400). In some embodiments, the process (900) is implemented in software instructions, thus when the processing circuitry executes the software instructions, the processing circuitry performs the process (900). The process starts at (S901) and proceeds to (S910).

At (S910), 3D coordinates of a set of points of a point cloud can be received. For example, the 3D coordinates can be obtained from an octree coding or decoding process. However, other coding or decoding processes can be utilized in other embodiments. In addition, the set of points can include first points of which attribute values have been reconstructed and available for attribute prediction of a current point included in the set of points.

At (S920), a group of neighboring points of the current point can be determined from the first points, as described above. For example, the group of neighboring points can be a set of nearest neighboring points in terms of geometric distances to the current point.

At (S930), an indicator is received. The indicator may indicate whether reconstruction of the current point in a prediction step in a lifting scheme is based on a weighted average prediction of the reconstructed attribute values of the plurality of neighboring points or a reconstructed attribute value having the lowest cost among the reconstructed attribute values of the plurality of neighboring points. In some examples, the indicator may be an index determined based on a rate-distortion function performed on each of the reconstructed attribute values of the plurality of neighboring points and a weighted average of the reconstructed attribute values of the plurality of neighboring points. For example, a distortion can be measured by a difference between the original (or true) attribute value of the current point and a candidate prediction (candidate reconstructed attribute value). A rate can be a cost of encoding the index of the candidate prediction. A Lagrangian RD-cost function can be used to determine the best prediction signal candidate.

At (S940), reconstructing the current point based on the received indicator. In some examples, the cost of the weighted average of the reconstructed attribute values of the plurality of neighboring points is compared to the lowest cost among the reconstructed attribute values of the plurality of neighboring points. If the encoder determines that the cost of the weighted average of the reconstructed attribute values of the plurality of neighboring points is lower than the lowest cost among the reconstructed attribute values of the plurality of neighboring points, then the encoder may signal an index indicating the weighted average of the reconstructed attribute values of the plurality of neighboring points to be the attribute value predictor. If the encoder determines that the cost of the weighted average of the reconstructed attribute values of the plurality of neighboring points is not lower than the lowest cost among the reconstructed attribute values of the plurality of neighboring points, then the encoder may signal an index indicating the lowest cost among the reconstructed attribute values of the plurality of neighboring points to be the attribute value predictor. The process (900) proceeds to (S999), and terminates at (S999).

IV. Computer System

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
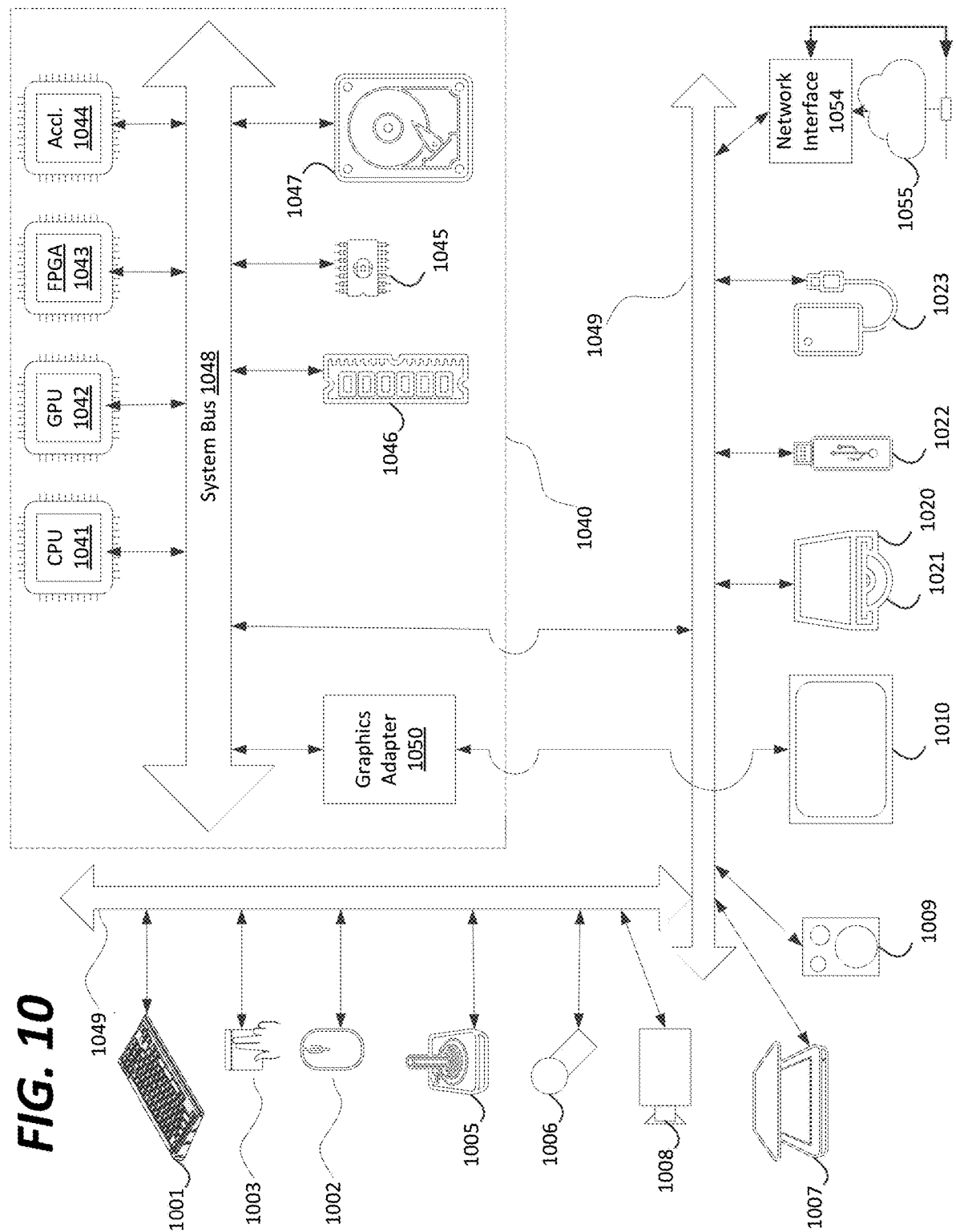
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of processing point cloud data at a decoder, comprising:
    receiving three dimensional (3D) coordinates of a set of points of a point cloud including first points and a current point, each of the first points being associated with a reconstructed attribute value;
    determining a plurality of neighboring points of the current point from the first points;
    receiving an indicator and determining whether the indicator indicating that reconstruction of the current point in a prediction step in a lifting scheme is based on a weighted sum of all of the reconstructed attribute values of the plurality of neighboring points or based on a single one of the reconstructed attribute values of the plurality of neighboring points;
    in response to the received indicator being determined as indicating that the reconstruction of the current point is based on the weighted sum of all of the reconstructed attribute values of the plurality of neighboring points, reconstructing the current point in the prediction step in the lifting scheme based on the weighted sum of all of the reconstructed attribute values of the plurality of neighboring points; and
    in response to the received indicator being determined as indicating that the reconstruction of the current point is based on the single one of the reconstructed attribute values of the plurality of neighboring points, reconstructing the current point in the prediction step in the lifting scheme based on a reconstructed attribute value of a selected one of the plurality of neighboring points.

2. The method of claim 1 wherein
    the plurality of neighboring points of the current point is a subset of the first points that are nearest to the current point in terms of geometric distances.

3. The method of claim 1, wherein
    the indicator is generated based on a determination that a measurement of variability of the reconstructed attribute values of the plurality of neighboring points is below a threshold.

4. The method of claim 3, wherein
    the variability of the reconstructed attribute values of the plurality of neighboring points is a maximum difference of the reconstructed attribute values among the plurality of neighboring points.

5. The method of claim 1, further comprising:
    when the indicator is determined as indicating that the reconstruction of the current point in the prediction step in the lifting scheme is based on the single one of the reconstructed attribute values of the plurality of neighboring points, receiving an index indicating the reconstructed attribute value of the selected one of the plurality of neighboring points, the index being determined based on analyzing the reconstructed attribute values of the plurality of neighboring points according to a rate-distortion decision function; and
    determining the reconstructed attribute value indicated by the index to be an attribute prediction of the current point in the prediction step in the lifting scheme.

6. The method of claim 1, wherein the weighted sum of all of the reconstructed attribute values of the neighboring points is calculated based on geometric weights of the reconstructed attribute values of the neighboring points.

7. The method of claim 3 wherein the determination that the measurement of variability of the reconstructed attribute values of the plurality of neighboring points is below the threshold indicates that a neighboring region of the current point is homogeneous.

8. A method of processing point cloud data at a decoder, comprising:
    receiving three dimensional (3D) coordinates of a set of points of a point cloud including first points and a current point, each of the first points being associated with a reconstructed attribute value;
    determining a plurality of neighboring points of the current point from the first points;
    calculating variability of the reconstructed attribute values of the plurality of neighboring points;
    in response to the calculated variability of the reconstructed attribute values of the plurality of neighboring points being below a threshold, determining an attribute value predictor for the current point used in a prediction step in a lifting scheme based on a weighted sum of all of the reconstructed attribute values of the plurality of neighboring points; and
    in response to the calculated variability of the reconstructed attribute values of the plurality of neighboring points being greater than or equal to the threshold, determining the attribute value predictor for the current point used in the prediction step in the lifting scheme based on a single one of the reconstructed attribute values of the plurality of neighboring points that is a reconstructed attribute value of a selected one of the plurality of neighboring points, wherein
    the prediction step is performed before an updating step in the lifting scheme.

9. The method of claim 8, further comprising:
    in response to the calculated variability of the reconstructed attribute values of the plurality of neighboring points being greater than or equal to the threshold, receiving an index indicating the reconstructed attribute value of the selected one of the plurality of neighboring points, the index being determined based on analyzing the reconstructed attribute values of the plurality of neighboring points according to a rate-distortion decision function; and
    determining the reconstructed attribute value indicated by the index to be the attribute value predictor of the current point in the lifting scheme.

10. The method of claim 8, wherein the variability of the reconstructed attribute values of the plurality of neighboring points is a maximum difference of the reconstructed attribute values among the plurality of neighboring points.

11. The method of claim 8, wherein the weighted sum of all of the reconstructed attribute values of the neighboring points is calculated based on geometric weights of the reconstructed attribute values of the neighboring points.

12. The method of claim 1, wherein
    the indicator is determined based on a determination of whether a cost of the weighted sum of all of the reconstructed attribute values of the plurality of neighboring points is lower than a lowest cost among individual costs of the reconstructed attribute values of the plurality of neighboring points, and
    the cost of the weighted average of the reconstructed attribute values of the plurality of neighboring points and the individual costs of the reconstructed attribute values of the plurality of neighboring points are determined based on a rate-distortion decision function.

13. The method of claim 12, wherein
the indicator indicates a reconstructed attribute value having the lowest cost among the individual costs of the reconstructed attribute values of the plurality of neighboring points as the reconstructed attribute value of the selected one of the plurality of neighboring points when the cost of the weighted average of the reconstructed attribute values of the plurality of neighboring points is higher or equal to the lowest cost among the individual costs of the reconstructed attribute values of the plurality of neighboring points.

14. A method of processing point cloud data at a decoder, comprising:
receiving three dimensional (3D) coordinates of a set of points of a point cloud including first points and a current point, each of the first points being associated with a reconstructed attribute value;
determining a plurality of neighboring points of the current point from the first points;
receiving an indicator and determining whether the indicator indicating that reconstruction of the current point in a prediction step in a lifting scheme is based on a weighted sum of all of the reconstructed attribute values of the plurality of neighboring points or based on a single one of the reconstructed attribute values of the plurality of neighboring points;
in response to the received indicator being determined as indicating that the reconstruction of the current point is based on the weighted sum of all of the reconstructed attribute values of the plurality of neighboring points, reconstructing the current point in the prediction step in the lifting scheme based on the weighted sum of all of the reconstructed attribute values of the plurality of neighboring points; and
in response to the received indicator being determined as indicating that the reconstruction of the current point is based on the single one of the reconstructed attribute values of the plurality of neighboring points, reconstructing the current point in the prediction step in the lifting scheme based on a reconstructed attribute value having the lowest cost among the reconstructed attribute values of the plurality of neighboring points.

15. The method of claim 14, wherein
the prediction step is performed before an updating step in the lifting scheme.

16. The method of claim 14, wherein
the plurality of neighboring points of the current point is a subset of the first points that are nearest to the current point in terms of geometric distances.

17. The method of claim 14, wherein the weighted sum of all of the reconstructed attribute values of the neighboring points is calculated based on geometric weights of the reconstructed attribute values of the neighboring points.

18. The method of claim 14, wherein
the indicator is determined based on a determination of whether a cost of the weighted sum of all of the reconstructed attribute values of the plurality of neighboring points is lower than a lowest cost among individual costs of the reconstructed attribute values of the plurality of neighboring points, and
when the cost of the weighted sum of all of the reconstructed attribute values of the plurality of neighboring points is determined as lower than the lowest cost among the individual costs of the reconstructed attribute values of the plurality of neighboring points, the indicator is determined as indicating that the current point is reconstructed based on the weighted sum of all of the reconstructed attribute values of the plurality of neighboring points.

19. An apparatus for processing point cloud data, the apparatus comprising:
processing circuitry configured to
receive three dimensional (3D) coordinates of a set of points of a point cloud including first points and a current point, each of the first points being associated with a reconstructed attribute value;
determine a plurality of neighboring points of the current point from the first points;
receive an indicator and determine whether the indicator indicating that reconstruction of the current point in a prediction step in a lifting scheme is based on a weighted sum of all of the reconstructed attribute values of the plurality of neighboring points or based on a single one of the reconstructed attribute values of the plurality of neighboring points;
in response to the received indicator being determined as indicating that the reconstruction of the current point is based on the weighted sum of all of the reconstructed attribute values of the plurality of neighboring points, reconstruct the current point in the prediction step in the lifting scheme based on the weighted sum of all of the reconstructed attribute values of the plurality of neighboring points; and
in response to the received indicator being determined as indicating that the reconstruction of the current point is based on the single one of the reconstructed attribute values of the plurality of neighboring points, reconstruct the current point in the prediction step in the lifting scheme based on a reconstructed attribute value of a selected one of the plurality of neighboring points.

20. The apparatus of claim 19, wherein
the indicator is generated based on a determination that a measurement of variability of the reconstructed attribute values of the plurality of neighboring points is below a threshold, and
the variability of the reconstructed attribute values of the plurality of neighboring points is a maximum difference of the reconstructed attribute values among the plurality of neighboring points.

21. The apparatus of claim 19, wherein the weighted sum of all of the reconstructed attribute values of the neighboring points is calculated based on geometric weights of the reconstructed attribute values of the neighboring points.

* * * * *